US012271780B1

(12) United States Patent
Fruchtman et al.

(10) Patent No.: US 12,271,780 B1
(45) Date of Patent: Apr. 8, 2025

(54) INTEGRATED APPLICATION FOR HANDLING TAGS AND BARCODES

(71) Applicant: Enterprise Data Resources, Inc., Marietta, GA (US)

(72) Inventors: Louis Fruchtman, Marietta, GA (US); Don Powers, Loganville, GA (US); Jeremy Norman, Dunwoody, GA (US); Lidia Dewberry, Kennesaw, GA (US); Dzmitry Belaboki, Cumming, GA (US); Stephen Powis, Tokyo (JP)

(73) Assignee: Enterprise Data Resources, Inc., Marietta, GA (US)

( * ) Notice: Subject to any disclaimer, the term of this patent is extended or adjusted under 35 U.S.C. 154(b) by 0 days.

(21) Appl. No.: 18/650,414

(22) Filed: Apr. 30, 2024

Related U.S. Application Data

(60) Provisional application No. 63/586,054, filed on Sep. 28, 2023.

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
CPC .......... G06K 7/10366; G06K 7/1413
See application file for complete search history.

(56) References Cited

U.S. PATENT DOCUMENTS

2014/0282923 A1* 9/2014 Narayan ............ H04W 12/50 726/5
2020/0051075 A1* 2/2020 Yoo .................. G06Q 20/409

* cited by examiner

*Primary Examiner* — Jamara A Franklin
(74) *Attorney, Agent, or Firm* — Armon Shahdadi; Pierson Ferdinand LLP

(57) ABSTRACT

Examples described herein relate to converting and printing tags such as radio-frequency identification ("RFID") tags. An example device can execute an application to be used for the process. The application can receive information associated with a first physical label, including a first product code, a company indication, and a product indication. A GUI associated with the application displays a graphical element representing the first physical label in a second information format different from the first. This second information format incorporates information associated with both the company indication and the product indication. The application generates a new value to be encoded into the memory storage of a second physical label and instructs an encoding device to encode the second physical label with the new value. The application can also instruct that human-readable elements associated with the new value be printed onto the second physical label.

20 Claims, 10 Drawing Sheets

INTEGRATED APPLICATION FOR HANDLING TAGS AND BARCODES

PRIORITY

This application claims priority to U.S. Provisional Patent App. No. 63/586,054 by the same title, filed Sep. 28, 2023, the entire substance and content of which is hereby incorporated herein.

BACKGROUND

Barcodes and tags, such as radio-frequency identification ("RFID") tags, are widely used in various industries to track assets and store information. The use of barcodes and tags has the potential to transform the way a business operates. For example, many industries that store, ship, sell, or otherwise transfer products or assets need a reliable and efficient way to track information about the individual units that the business handles. Different barcodes and tags (collectively referred to herein as "tags" for simplicity) can come in various different forms and generally require a scanner that can read the tags in some manner to gather information associated with the tag.

Gathering the information is only the beginning of the process, however. This information should be stored and processed in a useful and efficient way. And in this area, the current solutions fall short. Generally speaking, the options today are narrowly tailored and suffer from various limitations. For example, they cannot process different types of tags, cannot sufficiently incorporate industry conventions, and do not provide a functional graphical user interface ("GUI") that implements advanced techniques. In some cases they can become inundated with information—such as when a large pallet is scanned and thousands of tags are capture—to the point where a user cannot feasibly ascertain which entries are duplicates and cannot parse the information efficiently.

These problems are technologic problems specific to the tag-reading field of art. For example, when tags consisted only of written information or even laser-readable tags, the tags were processed one at a time—either by hand or by laser held by a hand. Only recently has it become possible for a person to scan an entire box, or shelf, or pallet in a single sweep. The exponential increase in required information processing and usability has not yet been sufficiently addressed.

The technological problems specific to this field continue, though, when considering the process of creating new tags. A business that sells or ships a product may be responsible for creating and applying tags to their products. If their buyer demands state of the art RFID tags, the business needs to generate those tags. This process is not a simple one, as RFID tags include a memory that must be programmed by software. They also need that programming to match any written information printed on the tag. They may want to even include a barcode printed on the RFID tag. And all of this must remain compliant with applicable standards from different sources. There is no integrated solution to this problem and mistakes are commonplace.

The solution described and claimed herein solves these and other problems that are specific to this field, providing advanced functionality through an intuitive GUI associated with an integrated application that performs novel functionality. This application can execute on a physical device in communication with one or more scanners and a display for providing the GUI. The application can also interface with a programmer and/or printer, or combination thereof, to generate new tags. These features are not found in the art and, by way of their innovative qualities disclosed and claimed herein, solve the problems described above that are specific to this technology field.

SUMMARY

Examples described herein include a device for converting and printing tags, a method for label printing, a method for label encoding, and related features and functionality. An example device is provided for converting and printing tags. The device includes a display that provides a GUI, a memory storage that stores instructions in the form of software, and a hardware processor that executes the instructions to perform various stages. In other examples, the device includes a memory storage and hardware processor that communicates with an external display, such as a fixed-mount device that is controlled remotely by a computer in a different location. The word "device" is not intended to limit the claims or disclosure to any particular type of device or a device with any particular components or features, unless specifically claimed.

These stages can include receiving information associated with a first physical label, which includes a first information format and a first product code and receiving a company indication and a product indication. The device can display on the GUI a graphical element representing the first physical label in a second information format, which is different from the first information format and incorporates information associated with both the company indication and the product indication. The device can generate a new value to be encoded into a second physical label and instruct an encoding device to encode the second physical label with the new value.

In some embodiments, encoding the second physical label can include transmitting the new value to a digital storage location of the second physical label. The stages can further include instructing the encoding device to print human-readable elements on the second physical label, wherein the human-readable elements correspond to the encoded new value. The device can also display a graphical representation of human-readable elements to be printed on the GUI. The GUI can allow a user to change the shape of the graphical representation or modify a location of at least a portion of the human-readable elements.

The present disclosure also provides a method for label printing. The method can include scanning a first physical label using a laser-based barcode scanner to obtain scanned information of the first physical label, determining that the scanned information of the first physical label indicates that the first physical label is a Universal Product Code-A ("UPC-A"), and displaying on a display associated with the barcode scanner a first graphical representation associated with the first physical label. The first graphical representation can include a company identifier field, a product identifier field, and a Global Trade Item Number ("GTIN") field.

The method can further include determining a company identifier and a product identifier, using the determined company and product identifiers to generate a GTIN identifier, and populating the GTIN field with the generated GTIN identifier. The method can also include displaying on the display a preview of an RFID label that the user wants to generate, using the GTIN identifier to encode a 96-bit value, and sending to an RFID-enabled printer instructions to encode and print an RFID label according to the encoded 96-bit value.

In some embodiments, the method can further include receiving from a user an indication of a number of digits for the company identifier associated with the first physical label, wherein determining the company identifier is based on the indication of the number of digits and the scanned information. The method can also include receiving from a user an indication of a number of RFID labels that the user wants to generate, generating unique, monotonically increasing serial numbers for the GTIN identifier, wherein the serial numbers correspond to the indication of the number of RFID labels that the user wants to generate, and encoding the 96-bit value based on the GTIN identifier and one of the generated serial numbers. Determining that the first physical label is a UPC-A can be performed based on comparing a length of the decoded barcode to a standard length for UPC-A.

In another example method for label encoding, similar stages can be performed as explained above, but rather than sending instructions to an RFID-enabled printer for encoding and printing, the device performing the method can encode the RFID labels directly. This can be useful in situations where the labels do not need human-readable elements printed on them or where an additional printing device is not available, for example.

The examples summarized above can, where relevant, be incorporated into a non-transitory, computer-readable medium having instructions that, when executed by a processor, cause the processor to perform the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings.

Examples described herein relate to converting and printing tags such as radio-frequency identification ("RFID") tags. An example device can execute an application to be used for the process. The application can receive information associated with a first physical label, including a first product code, a company indication, and a product indication. A GUI associated with the application displays a graphical element representing the first physical label in a second information format different from the first. This second information format incorporates information associated with both the company indication and the product indication. The application generates a new value to be encoded into the memory storage of a second physical label and instructs an encoding device to encode the second physical label with the new value. The application can also instruct that human-readable elements associated with the new value be printed onto the second physical label.

Figure 1:
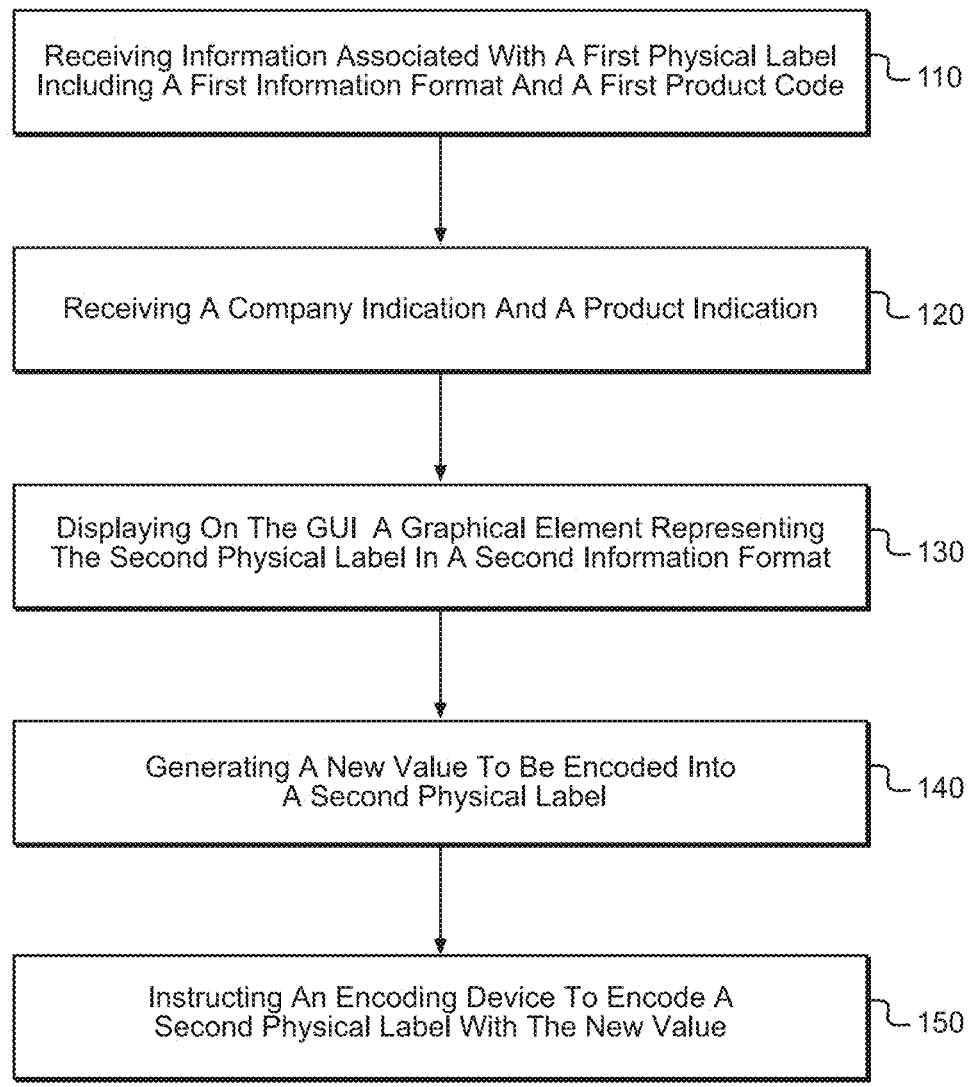
FIG. 1 is a flowchart of an example method for converting a physical label to a different type of label.

FIG. 1 provides a flowchart of an example method for converting a physical label to a different type of label. At stage 110 of the method, a device can receive information associated with a first physical label. The device can be any type of processor-based device, such as a phone, computer, or scanning device. The device can include memory storage and a display. In some examples the device includes scanning capabilities, such as laser barcode scanning or camera-based optical scanning. These capabilities can be built into any device, including a phone or computer, or could be provided in a dedicated scanning device. In some examples, a dedicated scanning device also includes a physical trigger for initiating a scanning process. Regardless of the particular form, all of these devices can execute an integrated application that provides the relevant functionality described herein. As a result, these various types of devices are simply referred to as a "device" or "devices" throughout, but such references should be understood to incorporate all potential device types that perform the described functionalities.

The information received at stage 110 can be received based on the device scanning the physical label. An example of this is using a laser-based scanner of the device to scan a barcode of the physical label. In another example, a laser-based scanner is connected to the device, either wirelessly or with a wired connection, and scans the physical label before providing the scanned information to the device. In yet another example, an electronic file is transmitted to the device. The file can include the same information about the physical label without requiring the device to scan the label or directly receive the scanned information upon scanning. Regardless of how it is received, the information can reflect a first information format of the first physical label as well as a first product code associated with the first physical label.

Stage 120 can include receiving a company indication and a product indication. In some examples, these indications are selections provided by a user. For example, the application executing on the device can include preset selections for companies, products, or both, and the user can simply make a selection to provide the requested information. In another example, the user can enter characters into a field to provide each indication. In yet another example, the scanned information from stage 110 can include information sufficient to provide the company indication and product indication.

Stage 130 can include displaying, on the GUI of the application executing on the device, a graphical element representing a second physical label in a second information format. In some examples, the graphical element is a preview of what a second physical label will look like. This can include the human-readable text to be printed on the second physical label, including the size, font, and location of that text, as well as any other elements such as barcodes, quick-response ("QR") codes, or other elements. The graphical element can also represent the size and shape of the second physical label to be printed. As described in more detail later in this disclosure, the graphical element can provide options for the user to customize the second physical label in various ways, including changing the information on the label, the layout of the information, and the size and shape of the label.

Stage 140 can include generating a new value to be encoded in the second physical label. This new value can be generated at the device and can reflect information necessary to encode the second physical label in the manner such that it includes information reflecting the first product code, company indication, and product indication. In some examples, the new value is encoded onto a label by wirelessly transmitting the new value to a memory storage of the label. This is how RFID tags are encoded, for example.

Stage 150 can include instructing an encoding device to encode the second physical label using the new value from stage 140. In some examples, the encoding device is the same as the "device" being described with respect to the previous stages. For example, a phone, computer, or scanning device can include an encoding device or module within it that provides this functionality. In the case of RFID, the encoding can be performed by an RFID reader/writer, an RFID printer, or any other device that includes a radio-frequency transmitter, including a computer or phone. The transmitter can emit a frequency that is picked up by a microchip within the RFID tag, which then stores the transmitted information in an available memory bank of the RFID tag. However, other transmission techniques and label types can be utilized according to this example method.

Figure 2:
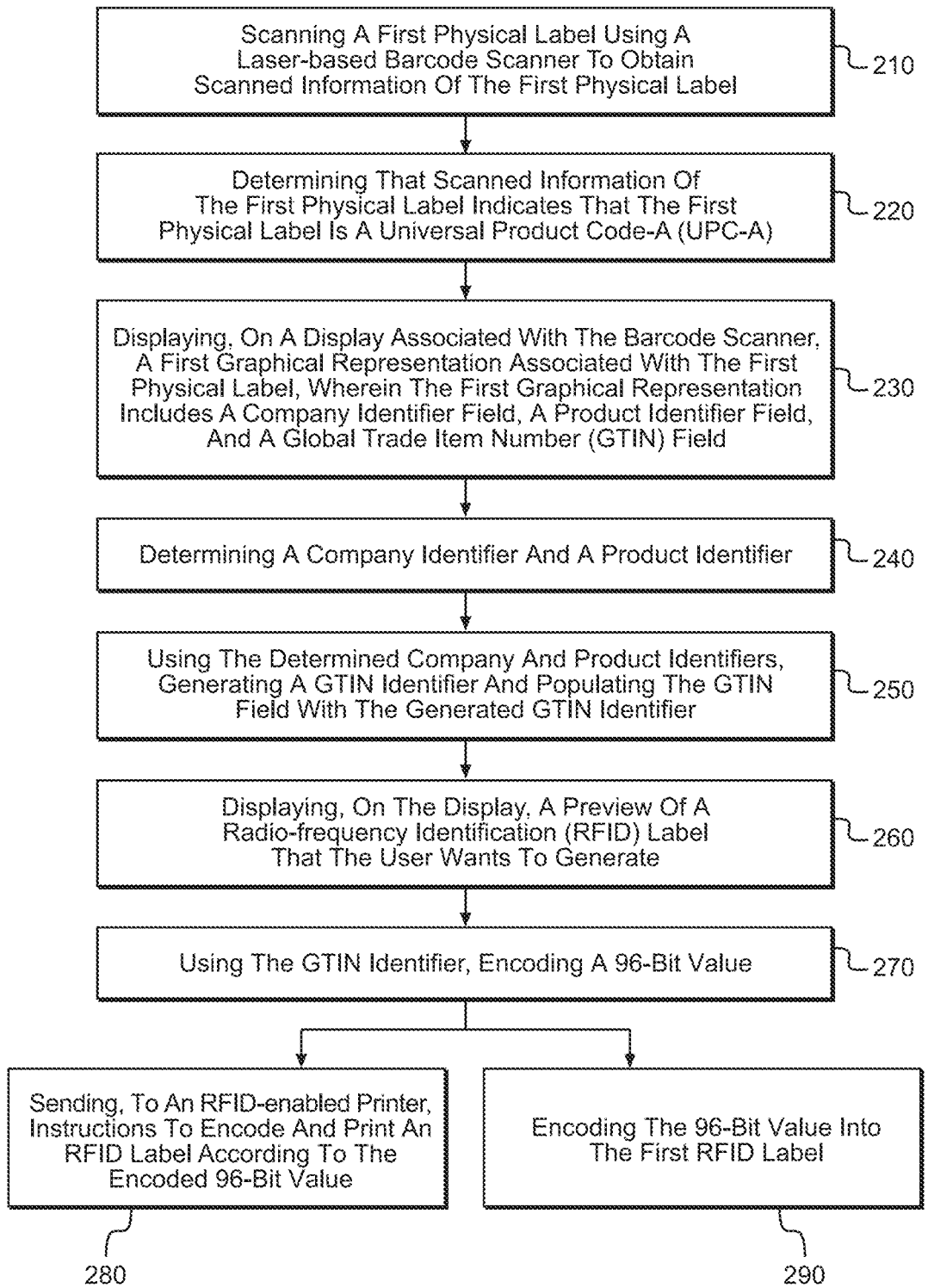
FIG. 2 is a flowchart of an example method for converting to, and encoding or printing, an RFID label.

FIG. 2 provides another example method for converting to, and encoding or printing, an RFID label. This method can be performed by the same types of devices described above with respect to FIG. 1. Turning to FIG. 2, stage 210 of the method can include scanning a first physical label using a laser-based barcode scanner to obtain scanned information of a first physical label. This stage can be performed by directing a laser scanner at a barcode printed on the first physical label, in an example. In other examples, this stage can be performed by an optical camera scanning any type of code, such as a QR code. As a result of this stage, the device can receive scanned information of the first physical label.

Stage 220 of the example method can include determining that the scanned information of the first physical label indicates that the first physical label is a Universal Product Code-A ("UPC-A"). UPC-A is a barcode symbology that uses a standard format and is the most common barcode format in the United States. The structure of a UPC-A barcode typically includes 12 digits that are uniquely assigned to a particular item. The 12 digits typically include one digit that identifies the "type" of product, a five-digit code assigned by GS1 (an international entity that develops and maintains standards for barcodes and related systems), a five-digit unique code assigned by the manufacturer, and a check digit used to verify the accuracy of the data encoded.

Stage 230 can include displaying, on a display associated with the device, a first graphical representation associated with the first physical label. The first graphical representation can include various fields. For example, it can include a company identifier field, a product identifier field, and a GTIN field. In some examples, these fields are populated with information extracted from the first physical label where available. In some examples, populating one or more fields requires modifying information extracted from the first physical label to make it match an industry standard, such as a standard set by GS1. Likewise, in some examples, populating one or more fields requires additional information from the user or from another source.

Stage 240 can include determining a company identifier and a product identifier. In some examples, this stage includes parsing the 12-digit UPC-A barcode to extract the company identifier and the product identifier from code. The exact number of digits used for the company identifier or product identifier in a UPC-A code is not necessarily encoded into the barcode itself. For that reason, the user may need to select how many digits are used for one identifier or the other. In one example, the use is prompted to select a number of digits for the company identifier length. Based on that selected length, the application executing on the device can extract the company identifier and the product identifier. In some examples, the length can be provided by a source other than the user. For example, the application can store a length of a company identifier for a particular set of tags and apply that predetermined length to future tags from the same batch. In another example, the first physical label is modified in a manner to provide the length information, and the application is able to gather this information as part of the scanned information described above.

At stage 250, the application executing on the device can generate a GTIN identifier. This stage can be performed using the determined company identifier and product identifier described in the preceding stage, in conjunction with relevant industry standards. For example, the application can utilize industry standards regarding the content and placement of digits within a GTIN identifier, such as a GTIN-14 identifier, which includes a company prefix, item reference, calculated check digit, and indicator digit.

This stage can also include populating the GTIN field in the graphical representation of the first physical label from stage 230. In some examples, the content of the GTIN field is color coded to show where the information came from. As an example, the portion of the GTIN identifier associated with the company identifier can be coded blue, while the portion associated with the product identifier is coded purple, and the check digit is coded green. These are merely examples, of course, and any combination of colors can be applied to any portions of the GTIN identifier as desired. This can allow a user to visually inspect the graphical representation of the first label, confirm its accuracy, and easily discern how the application generated the GTIN identifier. In some examples, the graphical representation of the first physical label also allows a user to select a number of tags that the user desires to create based on the first physical label.

At stage 260, the application executing on the device can display, on the GUI, a graphical preview of an RFID tag to be generated based on the preceding stages of the method. As part of this stage, the application can generate unique monotonically increasing serial numbers for the unique combination of the company and product identifiers. The serial number encoding can be managed, such that application manages the serial numbers and checks to confirm that a serial number is not reused. This can be used in situations where a user wants each tag to include a unique serial number. The device being used to generate the new tags can store the serial numbers locally for crosschecking against past and future serial numbers. In situations where multiple devices might be used to create the new tags, the serialization information can be stored at a cloud storage location that allows various devices to crosscheck this information. The serial number encoding can also be performed according to a predetermined increment, such as 1, 10, or another value. The encoding can also be performed manually, where the user enters a particular value.

In some examples, managed serialization includes designating particular serial number starting points or ranges for different types of products being tagged. As an example use case, a business may use a third party to create a first batch of RFID tags for a product sold by the business. The business then wishes to start using the disclosed application to create their own tags, but the tag numbers ideally should start from where the third party left off. In that scenario, the business can designate a starting serial number and the application can begin generating serial numbers from that starting point. In another example, a business wants to designate different serial number ranges for different types of products. By way of example, the business may designate a first product line, such as laptop computers, to serial numbers in a first range of numbers, and designate a second product line, such as charging accessories, to serial numbers in a second range of numbers. In that example, the user can utilize manage mode to map the different ranges of serial numbers to the different product lines. When a product type is selected in the application along with managed serialization, the application can automatically assign an appropriate serial number based on the product type selection.

Stage 260 can therefore include a preview of the serial number as well as a preview of the tag to be generated. In scenarios where multiple tags are being created, the user can scroll through previews of the different serial numbers. In some examples, the preview can include modification elements that allow a user to modify or customize the tag. For example, the preview interface can include multiple fields that a user can move, resize, or delete as desired. This is described in more detail below with respect to additional Figures.

At stage 270, the application executing on the device can generate a new value based on a GTIN identifier and a unique serial number as described above. For example, the new value can be a 96-bit value, such as a Serialized Global Trade Identification Number ("SGTIN96"). In situations where multiple tags are being created, and multiple serial numbers are generated in one or more previous stages, then stage 270 can include generating multiple SGTIN96 values, corresponding to the multiple serial numbers. The SGTIN96 includes information sufficient to encode an RFID tag in some examples.

Once the new value is created at stage 270, the example method can proceed according to whether the user wants to encode the RFID tags directly from the device that is executing the application and performing other stages described above, or whether the user wants to instruct another device to perform the encoding. For example, the user may wish to utilize a printer, such as an RFID printer, that can not only print human-readable text onto the surface of an RFID tag, but also encode the tag by transmitting the new value to a memory storage of the tag.

In the latter example, the method of FIG. 2 proceeds to stage 280. At this stage, the application can send the new value, such as a SGTIN96, to an RFID-enabled printer as described above. The application can also send instructions that instruct the printer to encode and print an RFID lag using the encoded value. The printer, in turn, can continue the method by printing human-readable text onto the tag, such as the relevant codes, brands, barcodes, QR codes, and graphics. The printer can also encode the tag by transmitting the encoded value to the memory storage of the tag.

In some cases, a user may want to encode one or more RFID tags without printing anything on the tag. In these situations the method of FIG. 2 can proceed to stage 290, either in addition to or in lieu of performing stage 280. Stage 290 can include encoding the new value into the RFID directly at the device. For example, as described above, a device that executes the application can also make use of RFID read and write hardware and functionality. These components of the device can be used to encode the new value directly, without making use of a printer or other external device. In an example where the user wants to encode RFID tags without printing anything on the tag, the method can skip the preview step at stage 260.

It should be noted that while certain example embodiments refer to particular identifier types, such as GTIN-14 and SGTIN96, the disclosure is not intended to be construed as being limited to these identifier types in any way. For example, the stages of FIG. 2 can apply equally to an example where a newer industry standard format for RFID encoding replaces the SGTIN96, and RFID-enabled printers are programmed to accept that format. The same goes for the other aspects of this disclosure, which should not be limited to particular data formats.

Turning now to the remaining drawings, FIGS. 3-10 provide different example GUI pages that can each correspond to aspects of the application described herein. The application can execute on any of the devices that can carry out the required functionality. These drawings are included with the understanding that the GUI functionality is, itself, part of the inventive solution to the problems described in the background section above.

Figure 3:
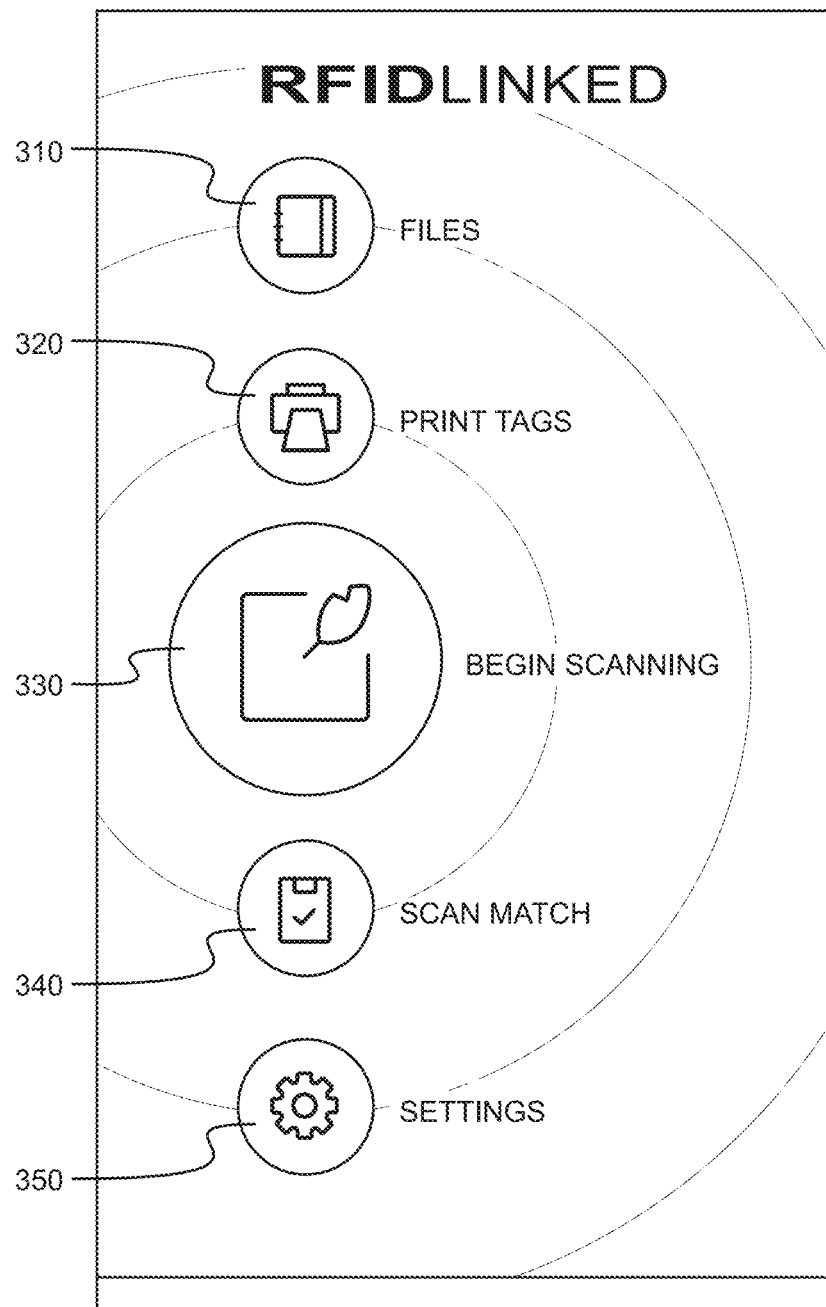
FIG. 3 is a depiction of a GUI screen of an integrated application for handling tags and barcodes.

FIG. 3 provides a depiction of an example GUI screen of an integrated application for handling tags and barcodes. The GUI page of FIG. 3 is a home screen of sorts, providing options for a user to utilize the various functions of the application. For example, a Files element 310 allows a user to view saved scan files. A scan file can be created when a user performs a scan and captures information from one or more nearby tags. For example, a scan file can be created by laser scanning a barcode and storing information related to that barcode. In another example, a scan file is created by performing an RFID scan of one or more items and storing the information returned as a result of that scan. In some cases where a box or pallet is being scanned, the scan file can include information regarding hundreds or thousands of tags. The scan file can be stored locally on the device, at a cloud storage location, or both.

The GUI page of FIG. 3 also includes a Print Tags element 320. This element can be selected to begin an example method, such as the method of FIG. 2, that results in a user printing and encoding tags such as RFID tags. A Begin Scanning element 330 is also included, allowing a user to launch a scanning interface that can include a soft button for scanning. A Scan Match element 340 is included in the GUI as well, providing filtering and matching functionality such that a user can determine whether a previously scanned tag is being scanned again. This feature can be useful where a product is tagged and scanned at one point in a manufacturing or packaging process, and then scanned at a later point in the process such as after being packaged into a box or pallet. The scan match function allows a user to confirm that a particular tag is included, or not included, in a scan by visually highlighting an element associated with the tag. Finally, a Settings element 350 is included for accessing various settings associated with the application.

Figure 4:
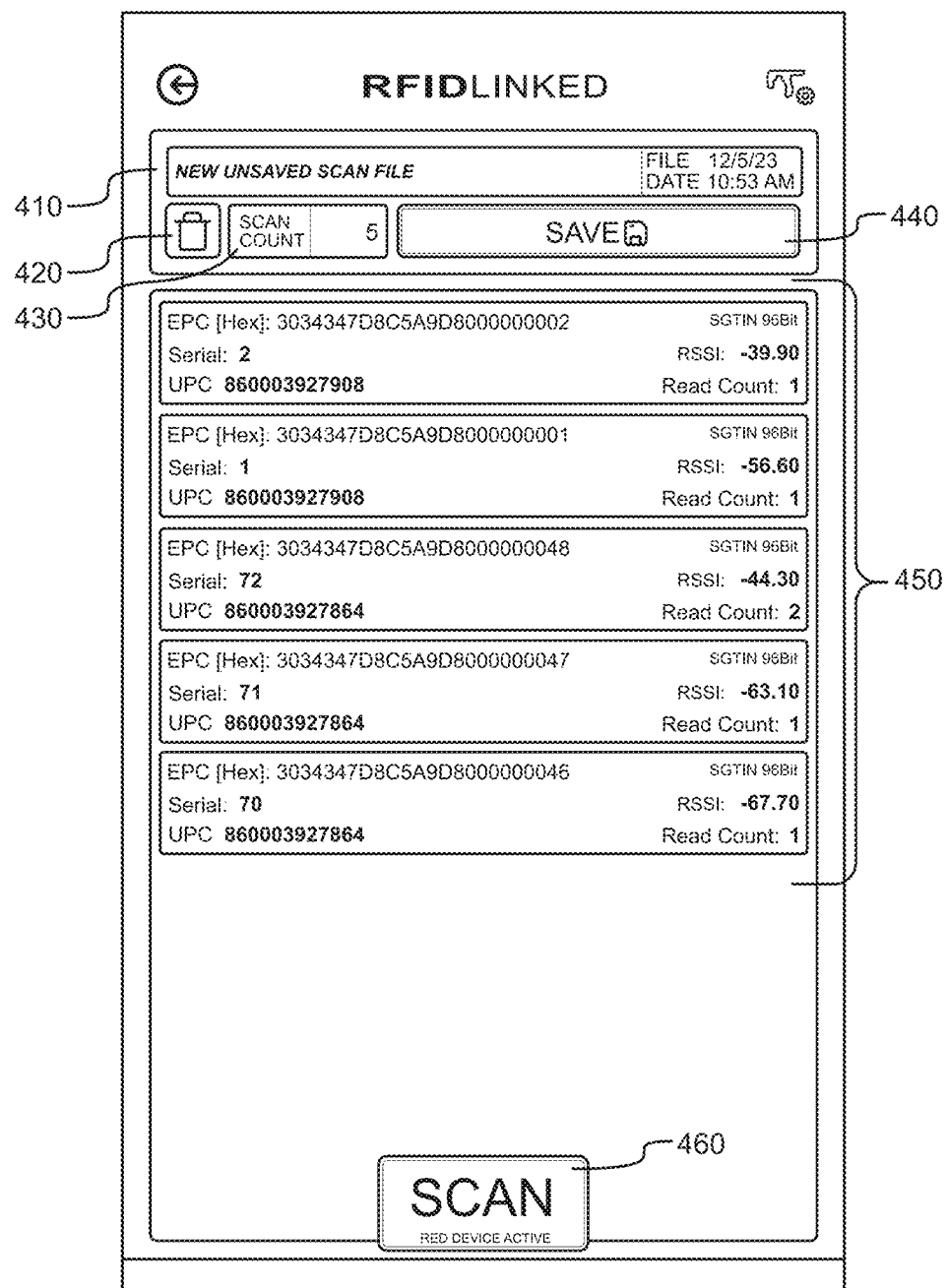
FIG. 4 is a depiction of another GUI screen of an integrated application for handling tags and barcodes.

FIG. 4 provides a depiction of another GUI screen of an integrated application for handling tags and barcodes. The GUI page of FIG. 4 shows the results of a scan before being saved. Element 410 is a graphical representation of the scan file, which includes a file date, a delete button 420, a scan count 430 indicating the number of tags returned by the scan, and a save button 440 for saving the results of the scan to local or cloud storage. The results of the scan are depicted by the entries 450 listing information for the scanned tags.

In this example, five tags have been scanned. Details relating to these tags, including the EPC, Serial No., and UPC are included in each entry. The entries also include a received signal strength indicator ("RSSI") indicating a power level of the signal returned from each RFID tag when interrogated by a reader. A scan button 460 is also included on the interface. This button can cause the device to perform a scan, either initially or subsequent to the first scan, and can be used in addition or alternatively to a physical scan button such as a trigger.

Figure 5:
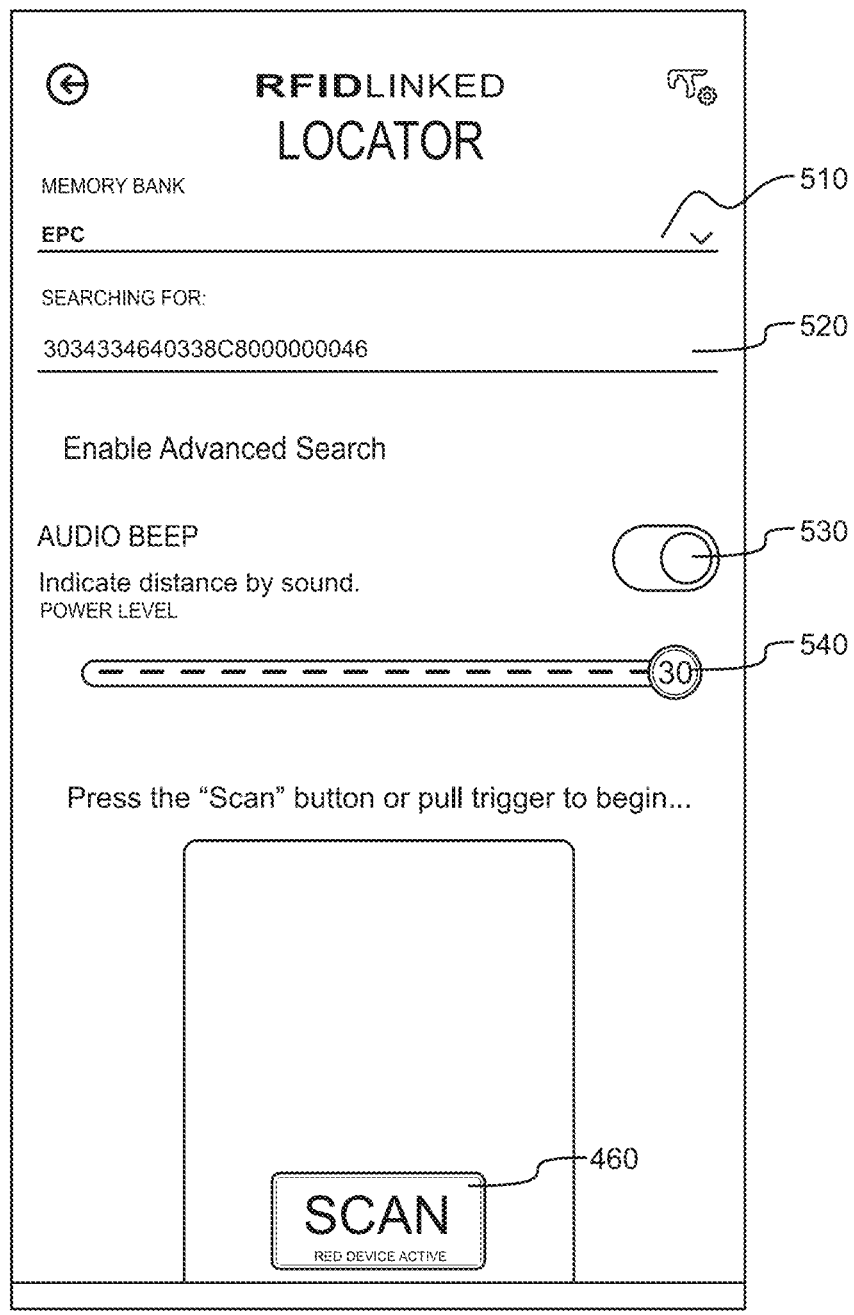
FIG. 5 is a depiction of another GUI screen of an integrated application for handling tags and barcodes.

FIG. 5 provides a depiction of another GUI screen of an integrated application for handling tags and barcodes. The GUI page of FIG. 5 relates to a locator function of the application that can be used to help a user locate a particular tag. For example, a user can select a memory bank and a value associated with a tag to be located. This can be done manually in some examples, but in other examples these fields 510, 520 can be populated based on selecting a saved filed or selecting tag information from the entries 450 of FIG. 4. The user can select a toggle for turning on or off an audio beep that indicates distance between the device and the tag using sound—for example, a louder or faster beep can indicate that the tag is closer, and a quieter or slower beep can indicate that the tag is further away. A power level slider 540 is also provided for selecting a power level of the scanning device. This can allow a user to optimize their search. For example, if the user knows the tag is nearby, a lower power level can be used to avoid capturing tags in other locations that are not relevant to the search. On the other hand, if the user does not know the tag location in a building, a higher power level can be used to broaden the search parameters. A scan button 460 is also included on the interface, similar to the scan button of FIG. 4, and can be used in addition or alternatively to a physical scan button such as a trigger.

Figure 6:
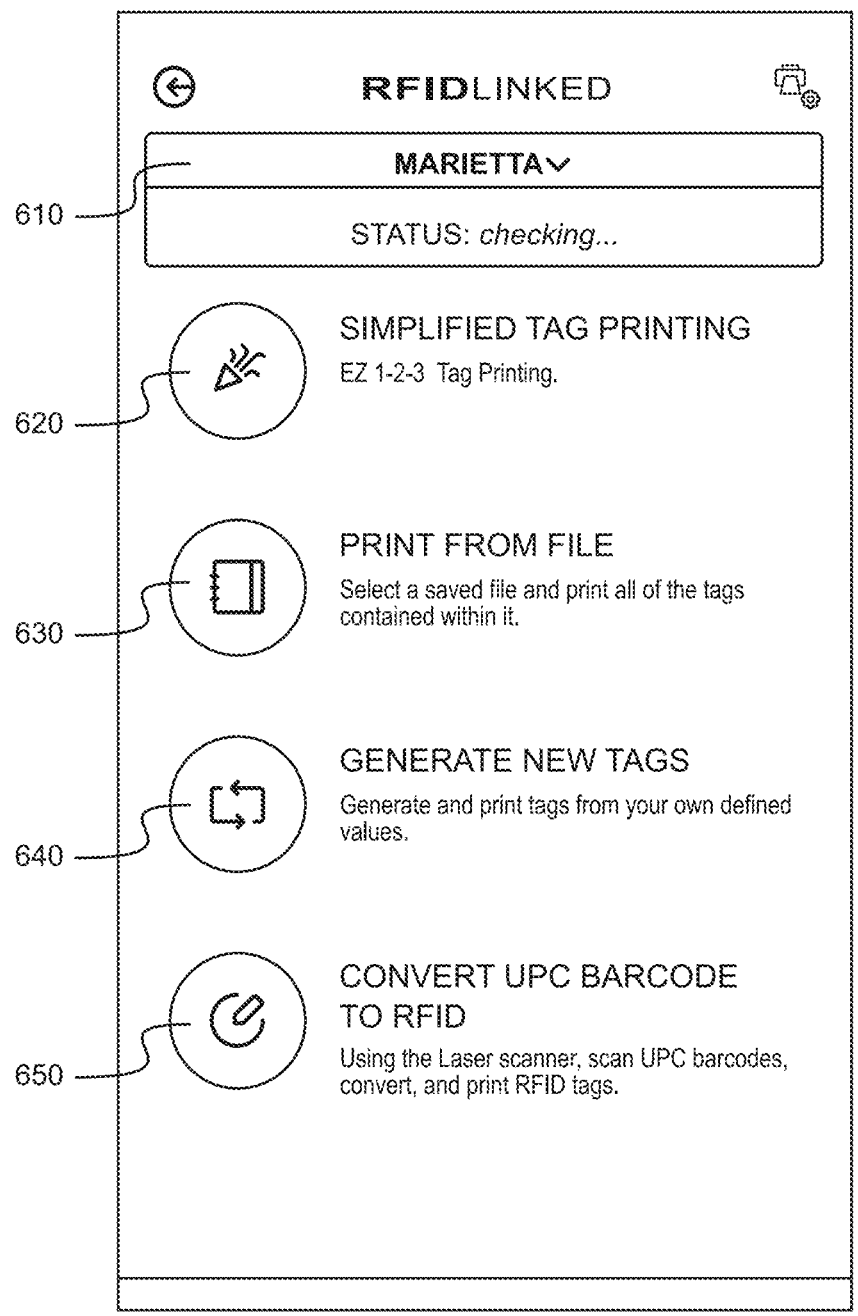
FIG. 6 is a depiction of another GUI screen of an integrated application for handling tags and barcodes.

FIG. 6 provides a depiction of another GUI screen of an integrated application for handling tags and barcodes. The GUI page of FIG. 6 provides various options for generating new tags. This GUI page can be displayed in response to a user selecting the Print Tags element 320 of FIG. 3, for example. The GUI page can include features related to printing, such as a printer selection element 610 that allows the application to identify and connect to a desired printer. The GUI page also includes a Simplified Tag Printing element 620 that launches a printing interface as described below with respect to FIG. 7. The Print From File element 630 can allow a user to select a saved filed that includes tag information, select a tag from that saved file, and print a tag based on the information. In some examples, selecting a file to print launches the FIG. 7 interface with pre-populated fields based on the saved file.

The GUI page can also include a Generate New Tags element 640 that presents an interface allowing a user to enter their own values for various fields associated with the printing operation. In some examples, this element 640 launches the GUI of FIG. 7 with a custom option pre-selected and the remaining fields blank. The GUI page can also include a Convert UPC Barcode to RFID element 650 that launches an interface such as the one depicted in FIG. 8 and discussed in more detail below.

Figure 7:
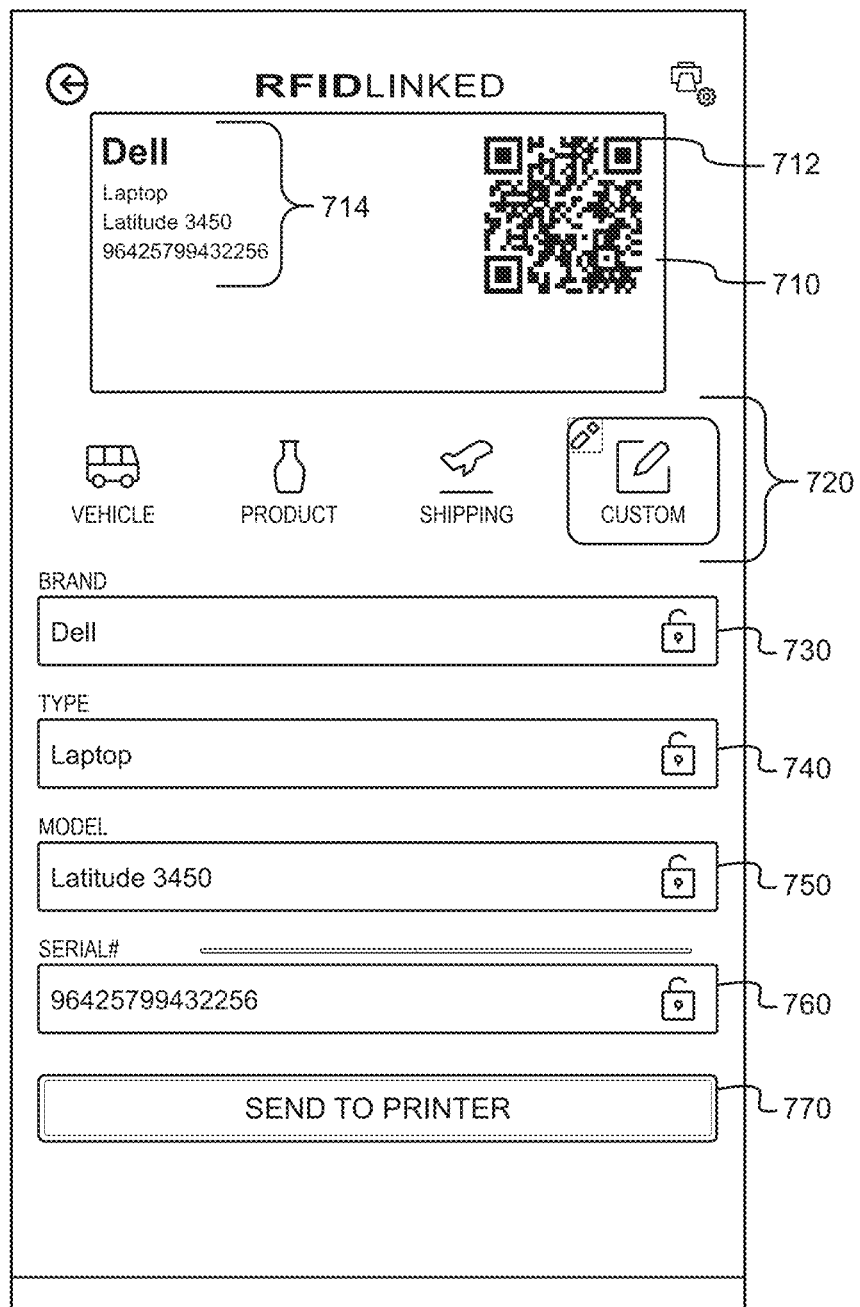
FIG. 7 is a depiction of another GUI screen of an integrated application for handling tags and barcodes.

FIG. 7 provides a depiction of another GUI screen of an integrated application for handling tags and barcodes. This GUI screen includes a tag preview element 710, showing tag information 714 and providing a visual code 712 such as a barcode or QR code. The interface can also include options 720 for selecting a type of tag, which can change the types of information included on the tag. For example, some industries may require particular standards that can be incorporated into the options 720. If the shipping industry requires a barcode rather than a QR code, for example, then the shipping option 720 can be configured to automatically generate a barcode instead of the QR code 712. A user can determine additional settings for each of these options 720. The user can also select the custom option, allowing them to select which fields to include and enter the information into those fields. As shown, potential fields based on these options 720 can include a brand 730, a type 740, a model 750, and a serial number 760. In conjunction with the printer selection from FIG. 6, a user can print these details to a tag by selecting the Send to Printer element 770. Printing can include encoding the tag by the printer.

Figure 8:
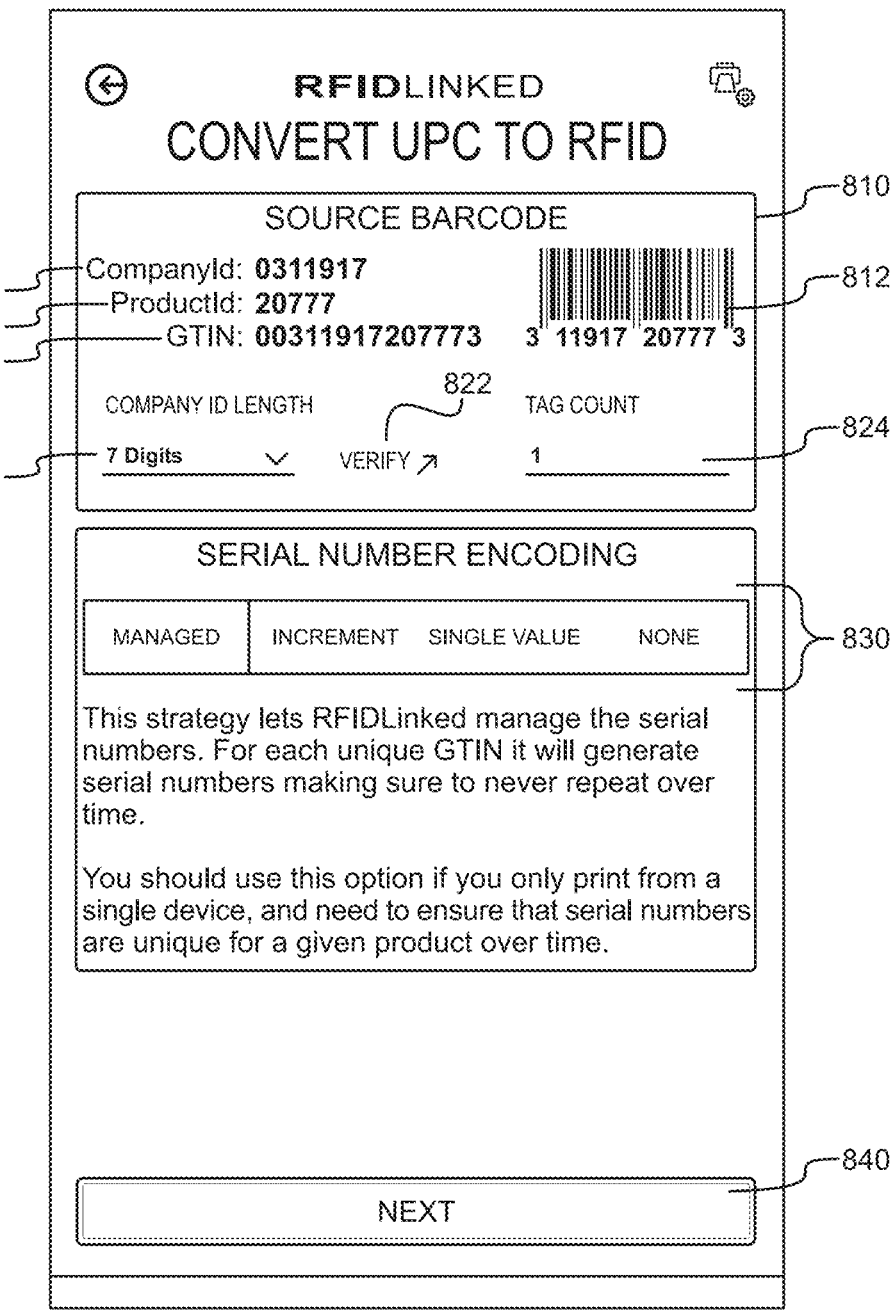
FIG. 8 is a depiction of another GUI screen of an integrated application for handling tags and barcodes.

FIG. 8 provides a depiction of another GUI screen of an integrated application for handling tags and barcodes. The interface of FIG. 8 relates to converting a UPC barcode to an RFID tag, and can be accessed by selecting element 650 of FIG. 6 in an example. The GUI screen of FIG. 8 can display after a user scans a barcode, such as by using a laser-based scanner. The GUI can display a visual representation 810 of the source barcode. This representation 810 need not provide the same format as the source barcode, but can include the relevant information from that barcode including additional information determined by the application.

For example, the representation 810 can reproduce the barcode 812 itself. It can also include a company identifier field 814, a product identifier field 816, and a GTIN field 818. In some examples, one or more of these fields is not populated until a user provides a selection at the company ID length field 820. In this example, the selection is for 7 digits. In some examples this GUI screen can utilize a default length for the company ID length field 820, such that the other fields 814, 816, 818 populate automatically. A user can then change the field 820 as necessary. The representation also includes a verify element 822 that, when selected, accesses a GS1 database to cross reference information within the representation 810 with relevant industry standards or company information. A tag count field 824 provides an indication of the number of UPC tags that have been capture for conversion to RFID.

The GUI can also include serialization selections 830 for managing the serial numbers associated with the RFID tags to be created. The serialization selections 830 can include managed, increment, single value, or none. Managed serialization means that the application handles generating and tracking the serial numbers, ensuring that the same numbers are not repeated for different tags. In some examples, Managed serialization includes designating particular serial number starting points or ranges for different types of products being tagged. As an example use case, a business may use a third party to create a first batch of RFID tags for a product sold by the business. The business then wishes to start using the disclosed application to create their own tags, but the tag numbers ideally should start from where the third party left off. In that scenario, the business can designate a starting serial number and the application can begin generating serial numbers from that starting point. In another example, a business wants to designate different serial number ranges for different types of products. By way of example, the business may designate a first product line, such as laptop computers, to serial numbers in a first range of numbers, and designate a second product line, such as charging accessories, to serial numbers in a second range of numbers. In that example, the user can utilize manage mode to map the different ranges of serial numbers to the different product lines. When a product type is selected in the application along with Managed serialization, the application can automatically assign an appropriate serial number based on the product type selection.

The serial numbers can be stored on the device or in the cloud, such that multiple devices can access them and manage serialization accordingly. The increment option provides serialization incrementally without cross checking a saved list of previously used serial numbers. The single value option allows the user to generate or enter a single serial number for multiple tags. And the none option foregoes the serial number entirely. A next button 840 allows the process to continue after selections are made.

Figure 9:
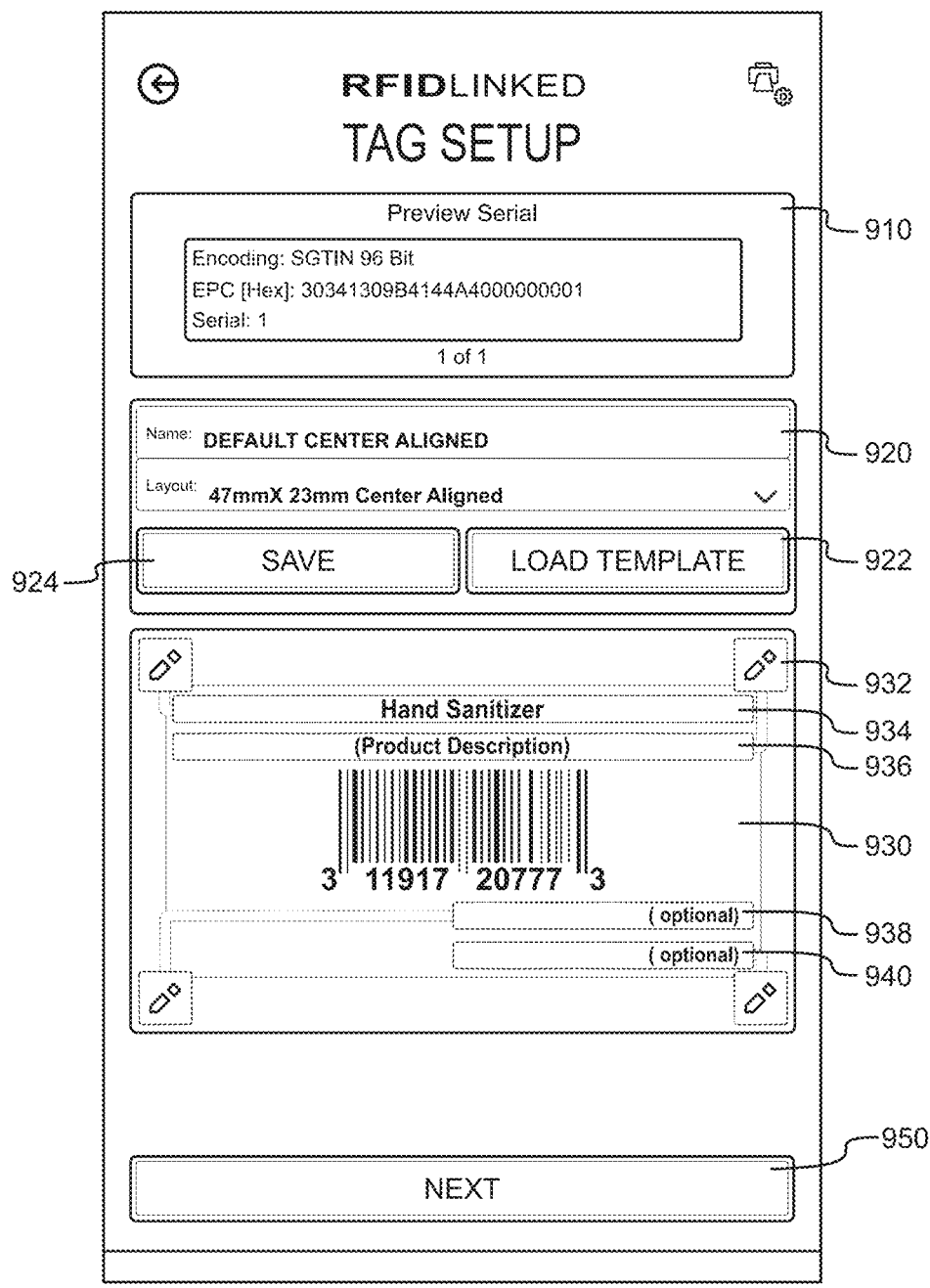
FIG. 9 is a depiction of another GUI screen of an integrated application for handling tags and barcodes.

FIG. 9 provides a depiction of another GUI screen of an integrated application for handling tags and barcodes. The GUI screen of FIG. 9 provides a preview and customization interface that allows the user to preview various elements as well as make changes to customize the tags before printing. For example, serial preview element 910 provides a preview of the serial number, or numbers, to be applied to the tags being printed. While this example shows 1 of 1 for the serial preview element 910, any number of serial previews can be shown. In examples where multiple serial previews are shown, arrows can be provided for paging through the different serial previews.

The GUI of FIG. 9 can also include template selection fields 920, such as a name and layout of a template. These fields can be programmed to populate automatically. A user can also select the load template element 922 to select from one or more saved templates. The user can also save a new template after changing the name or modifying the components and then selecting the save element 924. With respect to modifying components, an edit icon 932 is shown overlaid on top of a previewed RFID tag 930. The edit icon 932 allows a user to resize, reshape, or move one or more elements of the previewed RFID tag 930. The user can also select individual elements 934, 936, 938, 940 of the previewed tag 930, which can launch a soft keyboard allowing the user to edit text within those fields 934, 936, 938, 940. When the user is happy with the final preview 930, he or she can save using the save button 924 and proceed to the following step using the next button 950.

Figure 10:
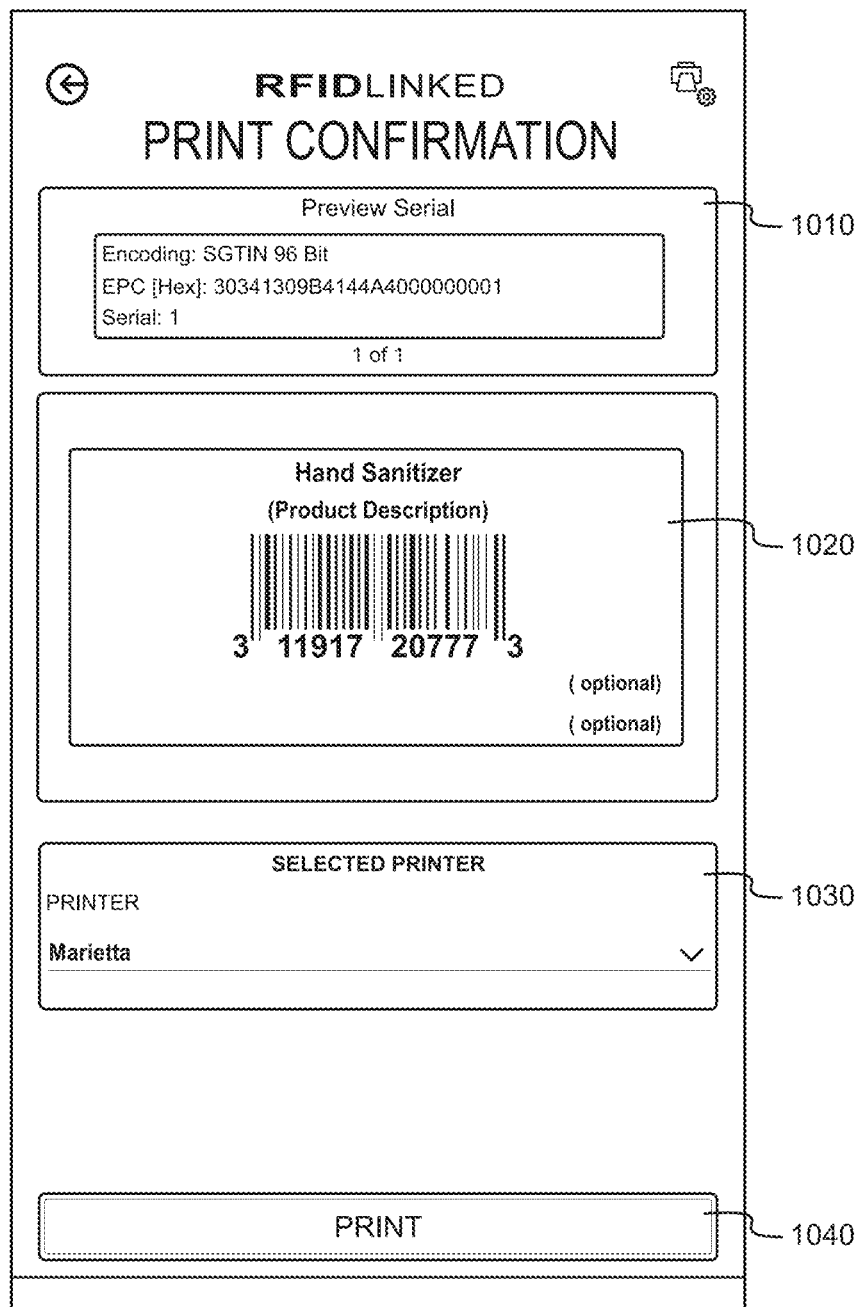
FIG. 10 is a depiction of another GUI screen of an integrated application for handling tags and barcodes.

FIG. 10 provides a depiction of another GUI screen of an integrated application for handling tags and barcodes. This GUI screen can be displayed after selecting the next button 950 from FIG. 9, for example. On this GUI screen, the serial number preview 1010 is shown along with a final tag preview 1020 reflecting the customization performed in relation to FIG. 9. The GUI screen can also include a select printer element 1030, allowing the user to select the printer to print and encode the relevant RFID tags. A print button 1040 finalizes the user's choices and causes an instruction to be sent to the printer for printing and encoding one or more RFID tags, according to the methods described herein.

The application and system disclosed herein can provide various features, some of which are already described above. These features are described further below. For example, the system can provide various data collection features. In one example, tag information such as saved scan files, templates, serial numbers, and/or printed tags can be stored and accessed through Application Programming Interface ("API") functionality. This can help larger business scale their operations. For example, when a scan file is saved in the application, the file can be backed up to a cloud storage location accessible to other devices belonging to the same customer or user. When the customer uses a different device, that device can access the saved scan file. This can allow one device to capture scan information while a different device utilizes that information to, for example, perform a scan match or tag filtering.

Using the cloud storage described herein, a business can utilize many different scanning devices that execute the disclosed application. These devices can then share data between them, gathering scan information from different devices and conglomerating the data in a single storage location. Any company device executing the application can access this information if desired. For example, ten different devices can be used to scan ten different pallets of products that arrive at a warehouse location. An eleventh device can be used to perform a scan match, such as when an outgoing box of products is scanned to determine whether the contents include any of the products scanned by those ten devices (or whether the contents include any items not scanned by those devices). In other words, any device can use the conglomerated data to perform the features and functionalities described herein.

The application can provide advanced tag filtering. For example, a user can select various attributes such as tag types, unique identifiers, codes, partial codes, or any other identifying information relevant to a tag. This can allow a user to pre-select one or more parameters that the user is looking for, either before or after performing a scan, and the application can isolate or otherwise highlight the matching tag information.

The application can further include data collection exports, allowing a user to export a large collection of tag data in common formats such as CSV or XLS. The application can receive an export request and generate the export file based on locally save data, data stored on the cloud, or a combination of both.

The application can also provide a full EPC decoder, which is an interactive tool that translates between different forms of an EPC. This translation can be performed according to the EPC Tag Data Standard ("TDS"). The EPC is an identification structure for physical objects. The decoder can translate keys encoded into a barcode into an EPC representing the same identifier, or vice versa.

The application can be updated to utilize the latest industry standards and compliance tools. This ensures that a customer remains current with their industry requirements and avoids potential losses based on noncompliance.

Although the examples described above have generally related to devices with built-in capabilities such as scanning and a display for presenting a GUI, the application disclosed herein can execute on various types of devices. For example, in fixed-mount mode, the application can execute across one or more devices, including an access point controller, and can allow for remote management of a fixed scanning device.

An example use case can include a loading bay of a warehouse. An area can be designated within the warehouse for scanning, such as an area through which new pallets are transported. The area can include one or more antennae mounted in a fixed position, such as on the ceiling or a wall. In some cases, it is useful to utilize multiple antennae at the same time. The different antennae can be operated according to different rules, such as instructing one antenna to operate using a lower power mode that only captures nearby tags in close proximity, and instructing another antenna to operating use a higher power mode that captures tags in a wider area. The individual antennae can be programmed to scan for different time periods as well. Furthermore, the antennae can be triggered automatically by another device, such as a motion sensor. In that case, when a pallet is moved into the scanning area, the motion sensor can detect motion and trigger a scanning procedure. The controller can receive the indication of motion from the motion sensor and instruct the antennae to perform a scanning process based on the programmed rules. The controller can then store the results locally at a memory storage associated with the controller. A user can access the results remotely from any location, such as a computer in another portion of the warehouse or anywhere else. In this example, the application can execute on the controller and/or on the remote computer used to interact with the controller.

This same type of example can be used to confirm the presence of inventory, particularly high value inventory. As an example use case, a jewelry stores can install a controller and fixed antenna in an inventory room or covering an entire store. At any given time, the controller can cause the antenna to perform a scan to determine the inventory items in the vicinity. This process can be automated such that it is performed on a regular basis, such as every day, hour, or minute. The system can therefore determine whether any inventory items have been removed from the inventory room or the store, when it was removed, and which particular item was removed. Rules can be implemented for further actions, such as providing a notification to a store owner or manager. In that example, a store owner may get a notification in the middle of the night that several inventory items have been removed in the past 5 minutes. The owner can then take appropriate action such as contacting the authorities to report a robbery. In some examples, more elaborate actions can be implemented. For example, rules can be implemented such that if an inventory item is removed from a storage room of the jewelry store outside of business hours, all doors within the store are locked again, the lights are turned on, additional cameras begin recording, an alarm sounds, and the police are alerted, or any combination thereof.

This same implementation can be extended to other use cases that do not directly relate to product management. For example, a controller and fixed antenna can be positioned near a door that requires badge access. The badges can include an RFID tag built into it or attached to it. The fixed antenna can be triggered to scan based on a person approaching the door, such as by a motion sensor or based on the user pushing a button. The antenna can pick up the RFID tag and provide that information to the controller, which can then compare the RFID tag information to an access list or deny-access list, or both. If the RFID tag information corresponds to a tag that indicates the user has access to enter the door, then the controller can send an instruction to the door to automatically open. Similarly, if the RFID tag information corresponds to a tag that indicates the user does not have access, then the controller can withhold the instruction such that the door remains closed. Other scenarios can be handled as well, such as a situation where two people approach the door and one user is authorized while the other is not. In that example, the controller can allow access but can send a notification to a security person that an unauthorized person has entered the area, along with an identification of the authorized person who allowed the unauthorized person to enter.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A device for converting and printing tags, the device comprising:
    a display that provides a graphical user interface ("GUI");
    a memory storage that stores non-transitory, computer-readable instructions; and
    a hardware processor that executes the instructions to perform stages, the stages comprising:
        receiving information associated with a first physical label including a first information format and a first product code;
        receiving a company indication and a product indication;
        displaying on the GUI a graphical element representing a second physical label in a second information format different from the first information format, wherein the second information format incorporates information associated with both the company indication and the product indication;
        generating a new value to be encoded into the second physical label; and
        instructing an encoding device to encode a second physical label with the new value.

2. The device of claim 1, wherein encoding the second physical label comprises transmitting the new value to a digital storage location of the second physical label.

3. The device of claim 1, wherein the stages further comprise instructing the encoding device to print human-readable elements on the second physical label, wherein the human-readable elements correspond to the encoded new value.

4. The device of claim 1, wherein the stages further comprise displaying a graphical representation of human-readable elements to be printed on the GUI.

5. The device of claim 4, wherein the GUI allows a user to change the shape of the graphical representation.

6. The device of claim 4, wherein the GUI allows a user to modify a location of at least a portion of the human-readable elements.

7. A method for label printing, comprising:
    scanning a first physical label using a laser-based barcode scanner to obtain scanned information of the first physical label;
    determining that scanned information of the first physical label indicates that the first physical label is a Universal Product Code-A (UPC-A);
    displaying, on a display associated with the barcode scanner, a first graphical representation associated with the first physical label, wherein the first graphical representation includes a company identifier field, a product identifier field, and a Global Trade Item Number (GTIN) field;
    determining a company identifier and a product identifier;
    using the determined company and product identifiers, generating a GTIN identifier and populating the GTIN field with the generated GTIN identifier;
    displaying, on the display, a preview of a radio-frequency identification (RFID) label that the user wants to generate;
    using the GTIN identifier, encoding a 96-bit value; and sending, to an RFID-enabled printer, instructions to encode and print an RFID label according to the encoded 96-bit value.

8. The method of claim 7, further comprising receiving from a user, at a company-ID-length field within the first graphical representation, an indication of a number of digits for the company identifier associated with the first physical label, wherein determining the company identifier is based on the indication of the number of digits and the scanned information.

9. The method of claim 7, further comprising:
receiving from a user, at a tag-count field within the graphical representation, an indication of a number of RFID labels that the user wants to generate; and
generating unique, monotonically increasing serial numbers for the GTIN identifier, wherein the serial numbers correspond to the indication of the number of RFID labels that the user wants to generate.

10. The method of claim 9, wherein encoding the 96-bit value is based on the GTIN identifier and one of the generated serial numbers.

11. The method of claim 7, wherein determining that the first physical label is a UPC-A is performed based on comparing a length of the decoded barcode to a standard length for UPC-A.

12. The method of claim 7, applying at least three colors to the GTIN in the GTIN field, wherein the three colors correspond to the company identifier, product identifier, and GTIN identifier, respectively.

13. The method of claim 7, wherein the preview of the RFID label includes a plurality of editable fields that, upon selection by the user, allow the user to independently modify each of the plurality of editable fields.

14. A method for label encoding, comprising:
scanning a first physical label, using a laser-based barcode scanner device with an onboard radio-frequency identification (RFID) radio, to obtain scanned information of the first physical label;
determining that scanned information of the first physical label indicates that the first physical label is a Universal Product Code-A (UPC-A);
displaying, on a display associated with the barcode scanner, a first graphical representation associated with the first physical label, wherein the first graphical representation includes a company identifier field, a product identifier field, and a Global Trade Item Number (GTIN) field;
determining a company identifier and a product identifier;
using the determined company and product identifiers, generating a GTIN identifier and populating the GTIN field with the generated GTIN identifier;
displaying, on the display, a preview of an RFID label that the user wants to generate;
scanning, by the barcode scanner device, a first RFID label to obtain a Tag ID;
using the GTIN identifier and the Tag ID, encoding a 96-bit value; and
encoding the 96-bit value into the first RFID label.

15. The method of claim 14, further comprising receiving from a user, at a company-ID-length field within the first graphical representation, an indication of a number of digits for the company identifier associated with the first physical label, wherein determining the company identifier is based on the indication of the number of digits and the scanned information.

16. The method of claim 14, further comprising:
receiving from a user, at a tag-count field within the graphical representation, an indication of a number of RFID labels that the user wants to generate; and
generating unique, monotonically increasing serial numbers for the GTIN identifier, wherein the serial numbers correspond to the indication of the number of RFID labels that the user wants to generate.

17. The method of claim 16, wherein encoding the 96-bit value is based on the GTIN identifier and one of the generated serial numbers.

18. The method of claim 14, wherein determining that the first physical label is a UPC-A is performed based on comparing a length of the decoded barcode to a standard length for UPC-A.

19. The method of claim 14, applying at least three colors to the GTIN in the GTIN field, wherein the three colors correspond to the company identifier, product identifier, and GTIN identifier, respectively.

20. The method of claim 14, wherein the preview of the RFID label includes a plurality of editable fields that, upon selection by the user, allow the user to independently modify each of the plurality of editable fields.

* * * * *